US012737833B2

(12) United States Patent
Wu et al.

(10) Patent No.: US 12,737,833 B2
(45) Date of Patent: Sep. 15, 2026

(54) GPU-SHARING METHOD AND APPARATUS FOR SERVERLESS INFERENCE LOADS

(71) Applicant: Huazhong University of Science and Technology, Wuhan City (CN)

(72) Inventors: Song Wu, Wuhan City (CN); Hao Wu, Wuhan City (CN); Zhuo Huang, Wuhan City (CN); Hao Fan, Wuhan City (CN); Yue Yu, Wuhan City (CN); Hai Jin, Wuhan City (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 101 days.

(21) Appl. No.: 19/038,995

(22) Filed: Jan. 28, 2025

(65) Prior Publication Data

US 2025/0285206 A1 Sep. 11, 2025

(30) Foreign Application Priority Data

Mar. 6, 2024 (CN) ......................... 202410256022.8

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC . G06T 1/20; G06T 1/60; G06F 9/5016; G06F 9/449; G06F 9/45558;
(Continued)

(56) References Cited

U.S. PATENT DOCUMENTS

2021/0117249 A1* 4/2021 Doshi ................... G06F 9/5072
2021/0232969 A1* 7/2021 Hu ........................ G06F 3/1438

FOREIGN PATENT DOCUMENTS

CN 114116220 3/2022
CN 116069481 5/2023
(Continued)

OTHER PUBLICATIONS

Tobler, L. (2022). Gpuless-serverless gpu functions (Doctoral dissertation, Master's thesis. ETH).*
(Continued)

*Primary Examiner* — Sarah Lhymn
(74) *Attorney, Agent, or Firm* — Michael Ye; Kalos Athena Wang PLLC

(57) ABSTRACT

A GPU-sharing method and apparatus for serverless inference loads is provided, wherein the method involves intercepting and forwarding GPU API calls made by inference tasks to an API proxy process to manage and allocate GPU resources. With a CPU and multiple GPUs connected through a bus, the GPUs communicate with the CPU only through an API proxy for process management and resource allocation of the GPUs. The CPU intercepts all GPU APIs triggered by any function of a same inference application, forwards the intercepted GPU APIs to a same designated GPU runtime for execution, and directs the GPU APIs triggered by each function to a pre-designated stream pool for the same inference application, so that all the functions of the same inference application share the same GPU runtime. The present disclosure solves the problem related to bulkiness of GPU runtimes in serverless inference systems, thereby facilitating GPU resource usage.

20 Claims, 5 Drawing Sheets

(58) Field of Classification Search
CPC ...... G06F 9/4881; G06F 9/5022; G06F 9/505; G06F 2009/45575; G06F 2209/5011; G06N 5/04
See application file for complete search history.

(56) References Cited

FOREIGN PATENT DOCUMENTS

| | | | | |
|---|---|---|---|---|
| CN | 116339960 | | 6/2023 | |
| CN | 117499494 A | * | 2/2024 | ............. H04L 67/61 |

OTHER PUBLICATIONS

Yu M, Wang A, Chen D, Yu H, Luo X, Li Z, Wang W, Chen R, Nie D, Yang H. Faaswap: Slo-aware, gpu-efficient serverless inference via model swapping. arXiv preprint arXiv:2306.03622. Feb. 8, 2024.*

Kojs K. A survey of serverless machine learning model inference. arXiv preprint arXiv:2311.13587. Nov. 22, 2023.*

* cited by examiner

GPU-SHARING METHOD AND APPARATUS FOR SERVERLESS INFERENCE LOADS

This application claims the benefit of China Patent Application No. 202410256022.8, filed on Mar. 6, 2024, which is incorporated by reference herein in its entirety.

BACKGROUND OF THE APPLICATION

1. Technical Field

The present disclosure relates to processors, and more particularly to a lightweight GPU-sharing method for serverless inference loads. More specifically, the present disclosure is about optimizing GPUs under the frame of serverless computing deployment in a virtualization environment so as to accelerate allocation and management of hardware resources and thereby enhance performance of inference applications in a deep neural network (DNN).

2. Description of Related Art

Inference based on deep neural networks has been extensively applied in various fields, such as autonomous vehicles, virtual reality, image recognition, etc. Functional requirements for realistic scene are more and more complex. An inference application is usually a task stream composed of plural deep learning models, like DNN models for target detection and for recognition of human faces and license plates in traffic control applications. Meanwhile, heterogeneous hardware based on graphics processing units (GPUs) has been widely used for acceleration in inference applications for its ability to run numerous matrix operations concurrently. However, inference applications have dynamic requests, making allocation and management of GPU resources challenges to developers. As a solution, inference systems based on serverless computing have been introduced, in which inference applications are deployed using a serverless computing framework, so as to enjoy the advantages of serverless computing, like flexible scalability, good cost efficiency, and transparent deployment. In a serverless computing framework, every model in an inference application can be packaged in a container, which is known as a function. The number of functions may be dynamic according to load variations.

Every container or process executed on a GPU requires a "GPU runtime", in which hardware context and a library for machine learning frameworks are packed. Since a GPU now has more computing cores than its predecessors and the batch size of an inference task is relatively small, it is usually the case that an inference task does not need to occupy an entire GPU for its resources. Based on this fact, appropriate allocation of GPU resources makes it possible to run plural containers or processes on a GPU concurrently. For example, MPS and MIG introduced by NVIDIA are technologies that support sharing of an NVIDIA-branded GPU among multiple containers.

CN114116220A discloses a GPU sharing control method, comprising: in response to activation of each deep-learning task, classifying the deep-learning task as a preliminary task or a secondary task, wherein the preliminary task is only one at most; determining runtime information of each DL task, wherein the runtime information indicates whether the task occupies a GPU runtime or not; determining whether the preliminary task is occupying a GPU runtime; and if the preliminary task is occupying a GPU runtime, controlling the GPU to run the preliminary task; or if the preliminary task is not occupying a GPU runtime, controlling the GPU to run the secondary tasks.

However, a GPU runtime in the single-machine configuration known as state of the art is quite bulky for functions and has at least the following issues. First, it causes unnecessary storage occupancy and redundancy. A function can occupy up to 1.5 GB of the GPU memory, wherein the GPU runtime takes up 95%. Thus, for an inference application, its development and deployment use runtimes almost the same. When there are plural functions sharing a single GPU, heavy redundancy can be generated among functions of the same inference application, and limit the deployment density in each GPU. The second issue is cold start delay. Cold start delays of a function can be 5 to 8 seconds, which is unacceptable to an inference task whose runtime is as short as 200 ms. Costs caused by cold start of a function mainly come from initialization of a GPU runtime and introduction of the machine learning framework. While warmup is a common means used in serverless computing to minimize occurrence of cold start, it is not suitable for GPUs due to storage occupancy required by GPU runtimes. The third issue is communication costs. Different GPU runtimes are in different isolated address spaces. Therefore, data transmission between two functions on a GPU involves using the CPU memory, and this leads to redundant data copies and heavy time costs, making inter-function data transmission very inefficient.

In view of this, the inventor of the present application has devised a lightweight GPU-sharing method for serverless computing, which minimizes storage occupancy and cold start costs caused by redundant GPU runtimes, and accomplishes intra-GPU data transmission, thereby improving inference performance and GPU sharing efficiency.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY OF THE APPLICATION

In order to facilitate sharing and usage of GPU resources, some known schemes for sharing GPU resources through porting computing tasks have been proposed. For example, a patent document numbered CN116069481A discloses a container scheduling system and scheduling method for sharing GPU resources. The known GPU-resource scheduling method includes the following steps: acquiring GPU task information of a plurality of heterogeneous application platforms, and containerizing the GPU tasks; receiving GPU container tasks of each platform, and forming a container task queue according to the required resource size; receiving GPU information fed back by a GPU resource management module, scheduling the container to a corresponding GPU node, and executing the container task. The existing technical scheme is about constructing a container system on a GPU resource pool, and scheduling containerized tasks from different platforms to designated GPU nodes in the resource pool, so as to achieve GPU resource sharing among heterogeneous platforms and improve overall usage of GPU resources across platforms. Thereby, the rapid and flexible deployment and implementation of cloud computing, big data, artificial intelligence and high-performance computing scene platforms can be satisfied. However, while the known scheme does schedule plural container tasks to a resource pool GPU node for processing, the process is not concurrent. Instead, it calls corresponding GPU resources successively according to the container task queue, and thus is inefficient in dealing with large-scale, concurrent computing tasks.

In order to solve the problem related to bulkiness of GPU runtimes in inference systems based on serverless computing, the present disclosure proposes a lightweight GPU-sharing method based on GPU streams. A GPU stream is defined as a series of operations to be executed on the GPU according to their orders in the commit sequence. Streams allow a GPU to run multiple kernels simultaneously.

Since similar inference services are usually developed and deployed in the same operating environment, the present disclosure novelly uses GPU streams to enable concurrent execution of multiple functions in a single GPU runtime. This not only reduces occupancy of storage space and costs of cold starts caused by redundant GPU runtimes, but also enables sharing of address space so as to achieve more efficient data transmission.

With a CPU and a plurality of GPUs connected through a bus, the GPUs communicate with the CPU only through an API proxy at the CPU. To allow multiple functions to share the same GPU runtime, the present disclosure takes the following steps.

For the step (1), the CPU intercepts all GPU APIs (from CUDA Libraries) triggered by any function of an individual a same inference application.

CUDA Libraries are the program design interface provided by NVIDIA Corporation. A user can compile a CUDA program according to CUDA APIs given in the CUDA library. Currently, CUDA Libraries are closed-source libraries.

Due to static compilation, every CUDA program has to be coupled to CUDA Libraries to form a binary file. A dynamic link is used to dynamically compile library files called by the CUDA program during execution of the program.

A CUDA API is the function interface for managing resources in CUDA Libraries, such as computing capacity, bandwidth, memory, etc. A CUDA program complied by a user is actually a sequence for calling CUDA APIs.

In the present disclosure, there is a pre-booted proxy process on each GPU. The proxy process serves to collect CUDA APIs forwarded to it by all functions, and to make them executed on the GPU successively under unified scheduling.

Specifically, in every function container, the official CUDA library is replaced by a custom CUDA library. According to the present disclosure, the program file of every CUDA API in the CUDA library is replaced (the replacement is particularly accomplished by inserting a program instruction before every CUDA API program to network with the pre-booted proxy process and forward the parameter information of CUDA API called by the CUDA program of the function).

In the step (2), the CPU forwards the intercepted GPU APIs to a same designated GPU runtime for execution, and directs the GPU APIs triggered by each function to a stream pool designated for the very same inference application in advance, so that all of the functions of the same inference application when executed share the same GPU runtime. Preferably, the GPU APIs triggered by each function are specifically designated to a respective predetermined stream in the stream pool.

Specifically, after a proxy process on a GPU starts, all CUDA APIs called in functions run on the GPU will be forwarded to the proxy process. In the proxy process, CUDA APIs from different functions are unifiedly scheduled, and triggered in one GPU runtime, thereby allowing plural functions to share a single GPU runtime.

In order to allow multiple functions to be run in a GPU runtime efficiently without mutual interference, for every function, a stream on the GPU is assigned. The CUDA APIs of every function will be forwarded to the assigned stream for execution. Further, since concurrent streams share resources such as the I/O, GPU memory, and computing capacity, in order to ensure performance isolation among functions run concurrently on a GPU, the proxy process unifiedly schedule CUDA APIs from different functions. In the proxy process, a task queue is maintained for every type of resources (e.g., I/O, GPU memory, computing capacity, etc.). APIs from different functions are automatically classified and sorted in different queues to wait for execution. Every task queue is taken care of by a dedicated thread. This thread pulls the CUDA APIs from the task queue according to a predesigned management module and scheduling rules so that the CUDA APIs are run by the GPU successively.

To sum up, the present disclosure provides a GPU-sharing method for serverless inference loads, which involves intercepting and forwarding GPU API calls made by inference tasks to a proxy process, so as to use the API proxy process to manage and allocate GPU resources.

By using GPU streams and GPU virtualization based on forwarding of CUDA APIs, the present disclosure allows multiple functions in a GPU to share a single GPU runtime.

A GPU program may be resolved into a sequence of GPU instructions (i.e., the calling sequence of CUDA APIs, including VRAM allocation, computing triggers, data copy between the CPU primary memory and the VRAM, etc.) to be sent to a GPU driver (i.e., a CUDA driver). Thus, by intercepting GPU instructions from different functions, and using a background management program (i.e., an API proxy) to sends the GPU instructions to a GPU driver in a Round-Robin manner, it is possible to make multiple functions on a GPU share a GPU runtime of the background management program. This particularly includes the following steps.

The step (1.1) is about, on every GPU, pre-booting a container that will act as a background management program, completing initialization of a GPU runtime in advance, and reserving the IP address of the management program.

The step (1.2) is about, in the starting stage of the functions, or the initialization stage of the containers, networking the functions with the background management program on the current GPU (i.e., socket connection) simultaneously through the IP address obtained in the step (1.1).

In the step (1.3), every time when the GPU program sends a GPU instruction (i.e., calls a CUDA API function), the interface function of the CUDA API is called first. By inserting a code in the interface function of every CUDA API, the inserted code forwards the information about calling CUDA APIs to the background management program as described in the step (1.1) through the socket connection as described in the step (1.2), thereby achieving interception and forwarding of GPU instructions in the GPU program. It is to be noted that the code insertion is made to open-source interface functions in the CUDA instruction libraries, and only the driving function to call interface functions is a closed-source binary file. Thereby, GPU virtualization can be accomplished when the CUDA instruction libraries and the driver are closed-source. Additionally, the CUDA instruction library with the code inserted can be prepared offline and is reusable.

In the step (1.4), the background management program on every GPU pre-boots a set of streams, and assigns a stream id to every function, so that the GPU instructions of every function will be directed to the corresponding stream for execution. This is because the GPU streams can send GPU instructions to the GPU driver simultaneously for concurrent execution (as defaulted, only one stream exists in one GPU runtime, so GPU instructions can only be executed successively).

At last, in the step (1.5), the background management program on every GPU classifies GPU instructions from different function first and puts them into different queues, such as VRAM allocation, computing triggers, data copy between the CPU primary memory and the VRAM, communication, etc. Then in the background management program, the GPU instruction queue of every type of resources is managed by a respective management module, which serves to pull GPU instructions of different functions from the queue for successive execution.

The conditions for forwarding include: all GPU instructions of functions related to the GPU program are intercepted and forwarded to the background management program. The background management program classifies the instructions into different types (e.g., VRAM, computing, I/O, etc.), and maintains a queue to implement management (1.5). The background management program has different management modules each serving to sort instructions in the corresponding queue into a sequence of execution. Besides, GPU instructions of different functions will be sent to the respective GPU streams assigned to the corresponding functions for execution, making the parameter, i.e., stream id, executed in the GPU instructions (calls for CUDA APIs).

For computing-related GPU instructions, the scheduling logic is closed-source. The background management program sends computing instructions it receives to the GPU driver. Therein, computing instructions from different functions are each executed with the assigned stream id.

On the other hand, VRAM-related instructions are managed by the VRAM management module. VRAM instructions from different functions are each assigned with a respective stream id. Since VRAM instructions do not interfere with each other, the background management program will, by default, send VRAM instructions to the GPU driver for execution as soon as it receives them.

As to I/O-related instructions, they are managed by the I/O management module. This module chunks I/O data first, and transmits data from different functions successively in a Round-Robin manner. It assigns a respective stream id to each I/O instruction.

To forward the instructions, information about a GPU instruction, such as its type (i.e., the type of CUDA APIs) and parameter, is transmitted through the socket connection (1.2) established with the background management program at the time a function is started.

Preferably, the API proxy manages the processes of the GPUs and allocates the resources of the GPUs through:

creating a memory pool;

in response to an incoming memory request, determining whether to assign a physical memory for the memory request according to type of the memory request;

determining, according to an assignment attribute of the physical memory, whether to apply for at least one additional physical memory from the memory pool; and determining whether to release the physical memory according to an access count of the physical memory.

As compared to the art known by the inventor(s), the disclosed GPU-resource management method can determine whether to assign corresponding physical memory according to the type of the memory request, and enables adaptive adjustment according to exact attribute information of the physical memory. According to the foregoing distinguishing technical features, issues can be addressed by the present disclosure may include: how to improve memory usage in the process of sharing GPU resources. Specifically, the disclosed lightweight GPU sharing optimization method for serverless computing based on GPU streams has the following advantages.

The first advantage is that it provides a flexibly scalable memory pool. Functions have a short life cycle (200 ms) that dynamically changes with the loads. However, the existing coarse-grained means for allocation and management of GPU memory tends to not only cause heavy time costs (longer than 30 ms), but also bring about significant memory idleness. While streams can share address space, and this provides functions with a pooled memory, it is nevertheless a challenge to determine the size of the memory pool. A too large memory pool can unnecessarily occupy idle resources, and is disadvantage particularly when it comes to serverless computing that is offered as a pay-as-you-go service. Besides, as inference applications are known for their dynamic requests, a static, coarse-grained memory pool is incompetent to provide satisfying memory resources and can cause low usage of the memory.

The second advantage of the present disclosure is that it supports transparent transmission of intermediate data. Transparent and efficient communication among functions in a GPU cluster is challenging for some reasons. First, deployment and placement of functions for serverless computing are transparent to user codes, and dynamically change with use of resources. Data transmission may be performed in one of three cases depending on distribution of functions across a GPU cluster, including transmission in the same GPU, transmission between two GPUs, and transmission between two GPU nodes. Each of the cases corresponds to a unique communication approach. The second reason is that intermediate data have to be cached in the GPU memory for efficient intra-GPU data transmission, but this undesirably necessitates additional memory space.

The third advantage of the present disclosure is that it enables fair sharing of the PCIe bandwidth. A function is an independent task, and includes introduction and computing of data. With GPU streams, computing tasks from different functions are to be executed concurrently. However, each GPU stream uses the PCIe bandwidth exclusively, which means that a stream that comes first will monopolize the transmission port, and only when all transmission tasks of it have been finished, can the next stream be processed. This seriously limits concurrency among functions.

Preferably, the step of "determining whether to assign a physical memory for the memory request according to type of the memory request" includes:

where the memory request is of the type of memory accessing, accessing a mapping to acquire the physical memory; and otherwise assigning a virtual address for the memory request, and inserting the assigned virtual address into the mapping table.

There are technical schemes designed for efficient management of memory sharing in a GPU. For example, a patent document published as CN116339960A has disclosed a management method for GPU-shared memory. The known method comprises: receiving the size of an applied memory block input by an upper layer application; making the upper layer application determine whether a memory block management linked list corresponding to the size of the applied memory block is found in a pre-stored memory block size mapping table according to the size of the applied memory block; and when determined that the memory block management linked list corresponding to the size of the applied memory block is found in the pre-stored memory block size mapping table, making the upper layer application acquire the memory block from the memory block management linked list and assign the memory block. In the known technical scheme, allocation of the GPU sharing memory is achieved by means of a memory pool, so as to solve problems about slow release and memory fragmentation. However, the known technical scheme is mainly about buffer management based on the GPU shared memory as required by the upper-layer application and then released, and irrelevant to improvement in memory usage by adjusting memory resources according to dynamic changes of inference application requests. Differently, the present disclosure is about determining whether to assign physical memory for a memory request according to the type of the memory request. With the aforementioned distinguishing technical features, issues that can be addressed by the present disclosure may include: how to minimize memory occupancy during stream-based GPU sharing by dynamically determining the size of a memory pool. Specifically, in the present disclosure, a memory pool is maintained during the API proxy process so as to reduce costs related to allocation and release of memory. When requests come, a mapping table is created for every request to record the mapping relation between the virtual address and the physical address. When a task requires a memory space, a virtual address is directly assigned and allocation of a physical address is held until the memory space is accessed. Meanwhile, the access count of each variable is monitored, and the memory resources occupied by the variable are automatically released when the variable is no more accessed. With the foregoing configuration, the present disclosure decreases memory allocation costs and reduces real-time memory occupancy.

Preferably, the step of "determining, according to an assignment attribute of the physical memory, whether to apply for at least one additional physical memory from the memory pool" includes:

where the physical memory has been assigned, acquiring the physical memory from the mapping table and accessing the physical memory; and otherwise requiring a new physical memory from the memory pool and inserting the required physical memory into the mapping table.

Preferably, the step of "determining whether to release the physical memory according to an access count of the physical memory" includes:

where the access count of the physical memory has reached a predetermined threshold, releasing the physical memory and updating the mapping table; and otherwise making a query to ascertain whether there is any memory request.

Preferably, before determining whether to assign a physical memory for the memory request according to the type of the memory request, the present method further includes:

ascertaining whether there is any memory request, wherein if there is a memory request, determining the type of the memory request, or otherwise ending the process.

Preferably, after releasing the physical memory, the present method further includes:

deleting the entry corresponding to the physical memory just released, and afterward making a query to ascertain whether there is any memory request.

Preferably, the GPU sharing method of the present disclosure also includes:

according to whether the function contains a call for GPU communication, determining whether to store data into a said GPU;

according to the type of a data-storing-related request, determining a storage address for the data to store; and according to the storage address, determining how to read the data to be stored.

Preferably, the step of "according to the type of a data-storing-related request, determining a storage address for the data to store" includes:

where the data-storing-related request is of the type of updating to store data, generating a unique index for intermediate data to be stored into the GPU, requiring a GPU address for storage of the intermediate data, and updating a global mapping table; and where the data-storing-related request is of the type of querying to store data, finding an address of the intermediate data using indexes on the global mapping table.

Preferably, the step of "according to the storage address, determining how to read the data to be stored" includes:

where the address of the intermediate data and the current function are present in the same GPU, replying with a GPU memory address, and determining whether an access count of the intermediate data has reached a predetermined threshold; and otherwise, determining whether the address of the intermediate data and the current function are present in a same node; and where the address of the intermediate data and the current function are present in the same node, acquiring the data in a cross-GPU manner through NVLink; and otherwise, remotely acquiring the data through RPC, and determining whether the access count of the intermediate data has reached the threshold;

wherein where the access count of the intermediate data has reached the threshold, updating the global mapping table, recovering the GPU address and a corresponding memory space, and ending the process; and otherwise ending the process directly.

Preferably, the GPU sharing method of the present disclosure also includes:

according to whether the function contains a call for IO transmission, determining whether to extract metadata and add the metadata to a function queue, wherein the metadata are divided into data chunks of a predetermined size and stored in a global device queue in a cyclic manner; and according to remaining storage capacity of a page-locked transmission buffer zone, determining whether to add the data chunks into the page-locked transmission buffer zone, and according to a synchronization attribute of the data chunks, determining whether to call a subsequent kernel.

Preferably, the step of according to remaining storage capacity of a page-locked transmission buffer zone, determining whether to add the data chunks into the page-locked transmission buffer zone, and according to a synchronization attribute of the data chunks, determining whether to call a subsequent kernel comprises:

where the page-locked transmission buffer zone does not have any remaining storage capacity, adding a newly incoming memory request to the global device queue through a preemption module; and otherwise, adding the data chunks to the page-locked transmission buffer zone so that the data chunks wait to be transmitted to the GPU successively as scheduled;

wherein where any of the data chunks has a synchronization mark, a background thread records an event, and calls cudaStreamWaitEvent, and a kernel scheduler schedules a subsequent kernel, after which this process ends; and otherwise, this process ends directly.

Preferably, the present disclosure also relates to a GPU-sharing apparatus for serverless inference loads, which includes:

a creation unit, for creating a memory pool;

an allocation unit, for in response to an incoming memory request, determining whether to assign a physical memory for the memory request according to type of the memory request;

an applying unit, for determining, according to an assignment attribute of the physical memory, whether to apply for at least one additional physical memory from the memory pool; and a release unit is used to determine whether to release the physical memory based on the number of accesses to the physical memory.

The present disclosure also proposes a lightweight GPU-sharing method for serverless computing based on GPU streams.

The disclosed method for optimization of VCPU scheduling based on a non-uniform memory access (NUMA) framework at least provides the following technical effects and advantages:

(1) the present disclosure uses GPU streams to prevent redundant GPU runtimes for inference tasks under serverless computing, so as to achieve data transmission in a GPU with reduced storage occupancy and cold start costs, thereby improving performance of inference services and GPU sharing efficiency;

(2) the present disclosure, based on the fact that functions are flexibly scalable, stateless, and fine-grained, further optimizes memory allocation, communication management and PCIe bandwidth sharing among streams, so as to allow GPU streams to better serve functions; and (3) the present disclosure can be implemented without modifying inference applications or the GPU driver, so it is adaptable to various machine learning frameworks and various DNN models, and is applicable to GPU products of different models and from different manufacturers.

DETAILED DESCRIPTION OF THE APPLICATION

Figure 1:
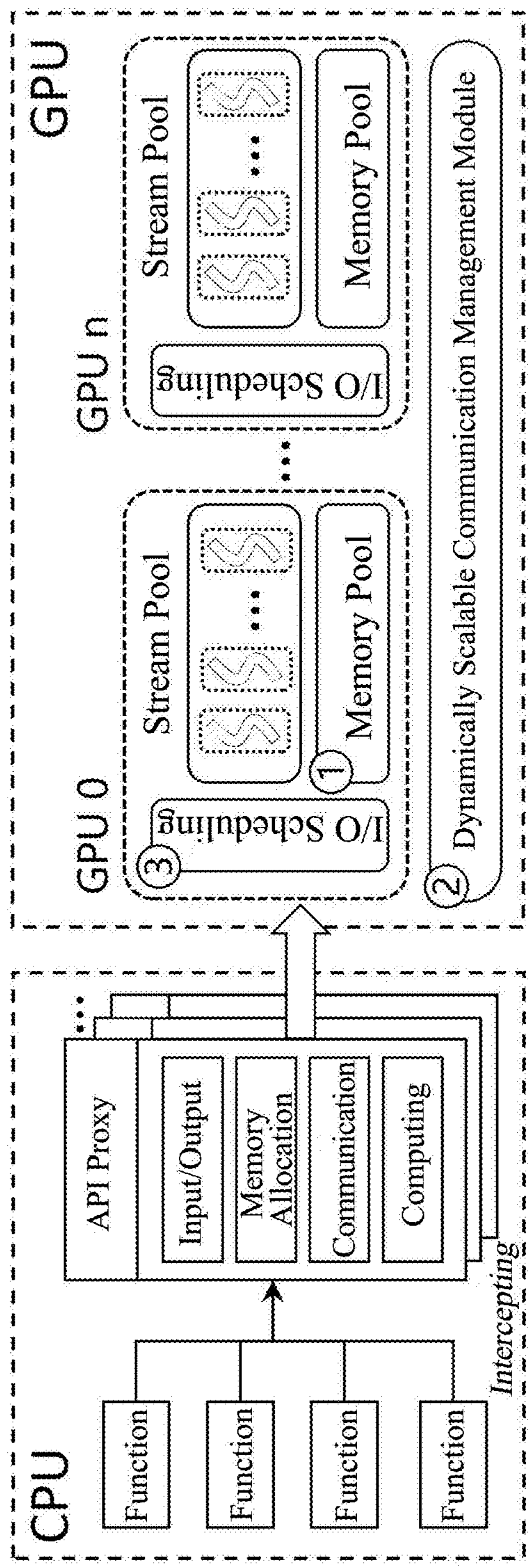
FIG. 1 shows a functional module diagram of a GPU-sharing method according to a preferred mode of the present disclosure.

The following description will be directed to some preferred embodiments as depicted in the accompanying drawings to make the advantages and features of the present disclosure clear to people skilled in the art and to better define the scope of the present disclosure. Although the accompanying drawings depict some exemplary modes of the present disclosure, it is to be understood that the modes referred herein are only illustrative but not intended to limit the present disclosure.

Embodiment 1

First of all, some terms involved in the embodiments of the present disclosure should be explained to facilitate understanding by those skilled in the art.

CUDA™ (Compute Unified Device Architecture) is a general concurrent computing frame introduced by NVIDIA, a chip manufacturer. The frame leverages the capability of GPUs in large-scale concurrent computing to better assign programs to cores of a GPU and thereby accelerate computing. Although CUDA is specific to GPU products bearing the name of NVIDIA, the fact that NVIDIA GPUs currently take the largest share in the industrial market makes the inventor of the present disclosure devise this CUDA-based method as disclosed herein.

The term "RPC" is the abbreviation of Remote Procedure Call, which is a protocol for calling a remote procedure. It allows one program to call a procedure (of a function or a method) in another address space (usually in a different machine) as it were a local procedure. The RPC allows different parts in a distributed system to communicate through a network. Its implementation usually includes a client and a server, wherein the client initiates a calling request, and the server, in response to the request, executes a relevant process.

The term "API" is the abbreviation of Application Programming Interface, which is a set of norms defining how different software components interact mutually. An API comprises a series of functions, protocols and tools. It allows communication and integration between different software applications. An API may be used for internal communication within a local application program, and may be used for communication between different application programs.

In the GPU programming framework, a programmer can create and manage plural GPU streams, so as to control concurrent computing tasks with improved precision. This is significant when it comes to processing of large-scale, concurrent computing tasks, such as deep-learning training. Every stream can run different instructions. By dividing instructions into different streams, a GPU can execute these instructions concurrently, thereby enhancing overall performance.

Deep neural networks (DNN) represent a kind of artificial neural networks. A DNN is constructed from plural neural network layers (also known as hidden layers) and formed as a deep structure. DNNs provide the foundation of deep learning and serve to deal with various machine learning tasks, such as image recognition, voice recognition, natural language processing, etc. The fact that a DNN contains considerable concurrentable computing operations makes GPUs the key to run and deploy a DNN.

Serverless computing is a cloud computing service model. It has changed the way in which server management is performed and allows developers to focus on compiling codes without being distracted by underlying configuration and maintenance of servers. In serverless computing, developers compile and deploy functions. These functions are small code units specific to tasks. There have been many commercial serverless platforms developed, such as AWS Lambda, Azure Functions, Google Cloud Functions, etc.

A kernel is the center of an operating system, and is an intermediate layer existing between hardware and software. It dominates a hardware device as system software that provides functions like multi-tasking and control of the hardware abstraction layer, the disks, and the file system. Briefly, a kernel is a computer program/code providing an operating system with functions like driving, managing memories, networking, etc., and it serves to deliver requests from applications to hardware.

To address issues seen in the existing art, an embodiment of the present disclosure provides a GPU-sharing method to be used in a computer device. It is to be noted that the subject of execution may be a GPU-sharing control apparatus. The apparatus may be implemented as a part or the entire of a computer device by means of software, hardware or a software-hardware combination. Therein, the computer device may be a terminal or a client or a server. It may be a server, or a server cluster composed of multiple servers. In the embodiment of the present disclosure, the terminal may be a smartphone, a personal computer, a tablet computer, a wearable device, or a smart robot. In embodiments detailed below, a computer device is described as the subject of execution for instance.

In the computer device, there may be one or plural GPUs. In a case where there are plural GPUs, the GPUs are GPU0, GPU1 . . . GPUN, wherein N is an arbitrary positive integer, which is determined by the quantity of GPUs contained in the computer device.

An inference task usually includes the following steps. First, it requires GPU memory for storing model data and intermediate data, and then model data and input data are transmitted through a PCIe channel. Afterward, a kernel is triggered to execute the computing task. The computing result is at last copied back to the CPU memory. To allow plural functions to operate in a single GPU runtime, it is necessary to intercept and forward calls for GPU APIs of the inference task to the proxy process.

The present disclosure provides a GPU-sharing method for serverless inference loads, which can include the following steps:

- creating a memory pool;
- in response to an incoming memory request, determining whether to assign a physical memory for the memory request according to type of the memory request;
- determining, according to an assignment attribute of the physical memory, whether to apply for at least one additional physical memory from the memory pool; and
- determining whether to release the physical memory according to an access count of the physical memory.

As shown in FIG. 1, the API proxy process unifiedly manages and allocates GPU resources, mainly in three aspects:

(1) Memory allocation: a memory pool is maintained during the API proxy process so as to reduce costs related to allocation and release of memory. When requests come, a mapping table is created for every request to record the mapping relation between the virtual address and the physical address. When a task requires a memory space, a virtual address is directly assigned and allocation of a physical address is held until the memory space is accessed. Meanwhile, the access count of each variable is monitored, and the memory resources occupied by the variable are automatically released when the variable is no more accessed. With the foregoing configuration, the aim of this aspect is to decrease memory allocation costs and reduce real-time memory occupancy.

(2) Communication management: the present disclosure provides a common communication API. First, for every entry of intermediate data, a globally unified index is assigned, and a mapping table is maintained in the CPU memory to record information of the intermediate data and the model of the GPU that stores the data. Before a function accesses the intermediate data, it consults the mapping table, and selects a way of data transmission according to where the intermediate data are stored. Particularly, when the function and the intermediate data are present in the same GPU, the function can directly acquire the physical address of the intermediate data.

(3) PCIe sharing: in the present disclosure, input data are first chunked into data chunks of a fixed size (e.g., 2 MB) to allow functions to share the PCIe bandwidth. Then data chunks from different functions are unifiedly scheduled for transmission in a Round-Robin manner by default. However, since the original data have been chunked for easy transmission, synchronous calls in the inference program become invalid, and thus the present disclosure has to maintain the synchronicity correctly while transmitting the data chunks simultaneously. This step is intended to ensure that the PCIe bandwidth can be shared by multiple requests.

Figure 2:
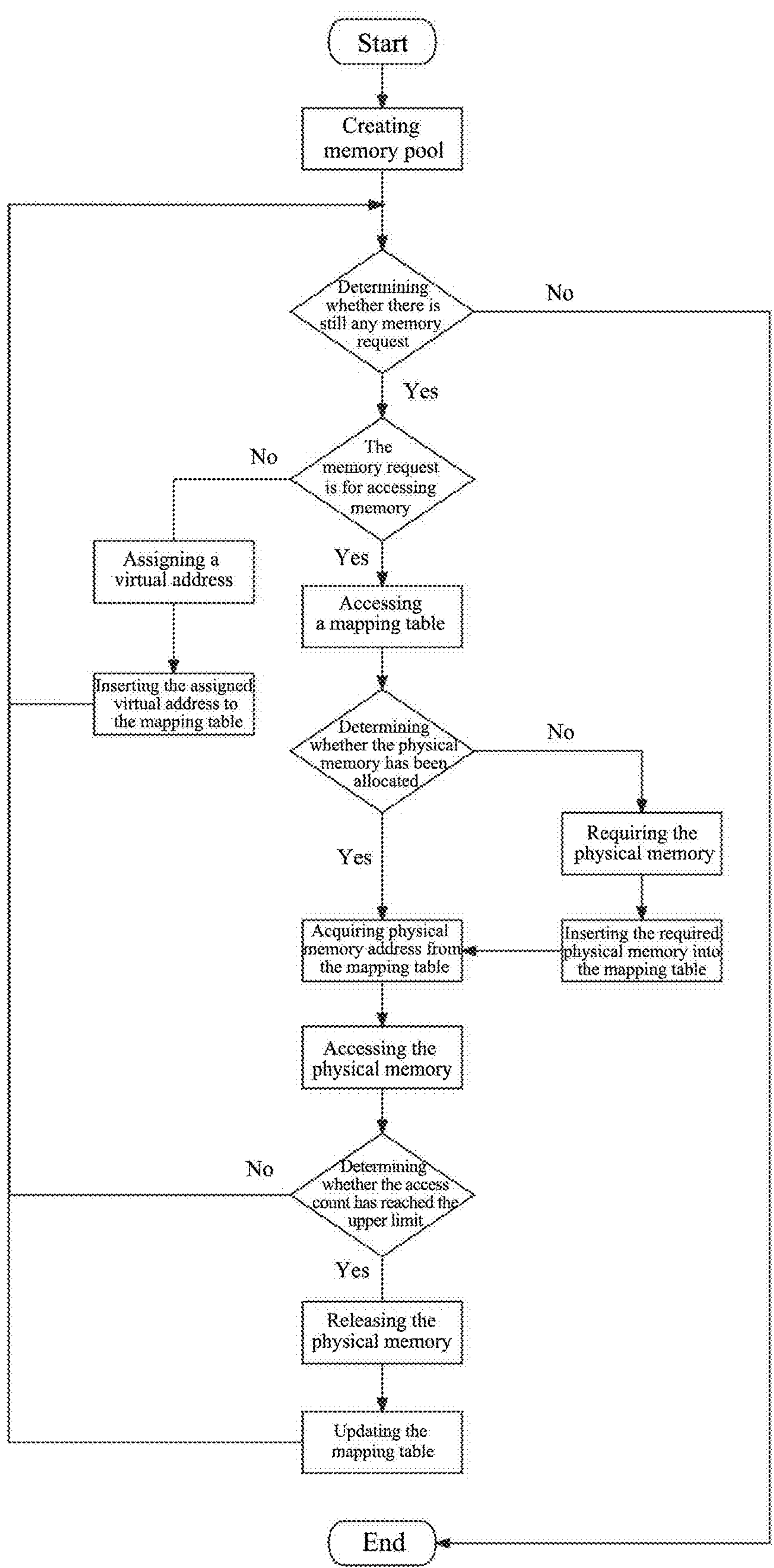
FIG. 2 is a detailed flowchart of memory allocation in a GPU-sharing method according to a preferred mode of the present disclosure.

FIG. 2 is a detailed flowchart of memory allocation in a GPU-sharing method for serverless inference loads according to a preferred mode of the present disclosure. Specifically, in the step of memory allocation, after the API proxy process starts, a memory pool is created. There are two kinds of memory requests, namely accessing and requiring memory. For a memory-requiring task, a virtual address is assigned and inserted into the mapping table. For an accessing task, it is first to determine whether physical memory has been allocated, and if not, physical memory is provisionally applied for and the mapping table is updated. A physical address acquired from the mapping table is used. Afterward, it is further to determine whether the access count of this part of memory has reached the upper limit, and if yes, this part of memory is released and the mapping table is updated. This particularly includes the following sub-steps:

S1.1: creating a memory pool;

S1.2: determining whether there is still any memory request, and if yes, jumping to the step S1.3, or otherwise jumping to the step S1.15;

S1.3: determining whether the memory request is for accessing memory, and if yes, jumping to the step S1.6, or, if not, jumping to the step S1.4;

S1.4: assigning a virtual address for the request;

S1.5: inserting the assigned virtual address to the mapping table, and afterward jumping to the step S1.2;

S1.6: accessing the mapping table to acquire a physical memory;

S1.7: determining whether the physical memory has been allocated, if yes, jumping to the step S1.10, or otherwise jumping to the step S1.8;

S1.8: requiring the physical memory;

S1.9: inserting the required physical memory into the mapping table;

S1.10: acquiring the physical memory from the mapping table;

S1.11: accessing the physical memory;

S1.12: determining whether the access count of the physical memory has reached the upper limit, and if not, jumping to the step S1.2, or if yes, jumping to the step S1.13;

S1.13: releasing the physical memory;

S1.14: updating the mapping table by deleting the entry corresponding to the physical memory just released, and afterward jumping to the step S1.2; and S1.15: ending.

Figure 3:
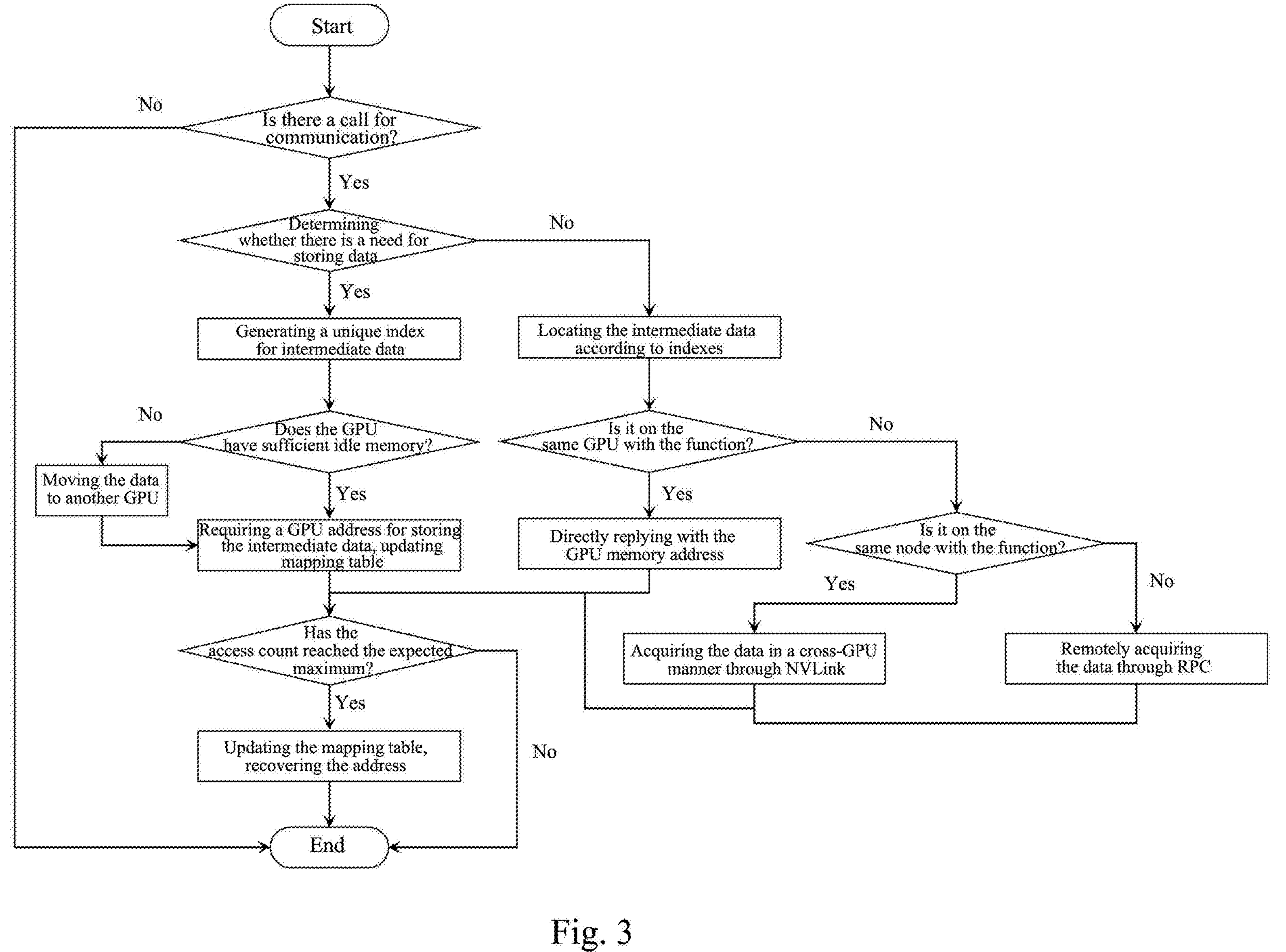
FIG. 3 is a detailed flowchart of communication management in a GPU-sharing method according to a preferred mode of the present disclosure.

FIG. 3 is a detailed flowchart of communication management in a GPU-sharing method for serverless inference loads according to a preferred mode of the present disclosure. Specifically, the present disclosure provides communication APIs consistent with the external storage of the serverless system in paradigm. The intermediate data are transmitted using two APIs, i.e., PUT and GET. With the present disclosure, an upstream developer can assign every entry of intermediate data with a globally unique index, which is then passed to subsequent features. Therein, PUT records the index and the physical address of an entry of data in the global table of the CPU memory. When a feature implements GET to access data with an index, a communication mechanism is selected according to where the feature is. This particularly includes the following sub-steps:

S2.1: detecting whether the function involves calling GPU communication, and if yes, jumping to the step S2.2, or, otherwise, jumping to the step S2.13;

S2.2: determining whether there is a need for storing data by determining what type the API is, and jumping to the step S2.3 for a PUT operation, or jumping to the step S2.9 for a GET operation;

S2.3: for intermediate data needing to be stored into the GPU, generating a unique index for the intermediate data;

S2.4: determining whether the GPU has sufficient idle memory, and if yes, jumping to the step S2.6, or otherwise, jumping to the step S2.5;

S2.5: moving the intermediate data to another GPU;

S2.6: requiring a GPU address for storing the intermediate data, and updating global mapping table;

S2.7: determining whether the number of times that the data have been accessed (such as being in a DNN task stream and accessed by a task of the next stage) reached the expected maximum, and if yes, jumping to the step S2.8, or otherwise, jumping to the step S2.13;

S2.8: updating the global mapping table, recovering the address and memory space, and jumping to the step S2.13;

S2.9: according to indexes in the global mapping table, locating the intermediate data;

S2.10: determining whether the located data and the current function are on the same GPU, and if yes, jumping to the step S2.11, or otherwise, jumping to the step S2.12;

S2.11: directly replying with the GPU memory address, and jumping to the step S2.7;

S2.12: determining whether the located data and the current function are on the same node, and if yes, cross-GPU acquiring the data through NVLink, or otherwise, remotely acquiring the data through RPC, and afterward jumping to the step S2.7;

S2.13: ending.

Figure 4:
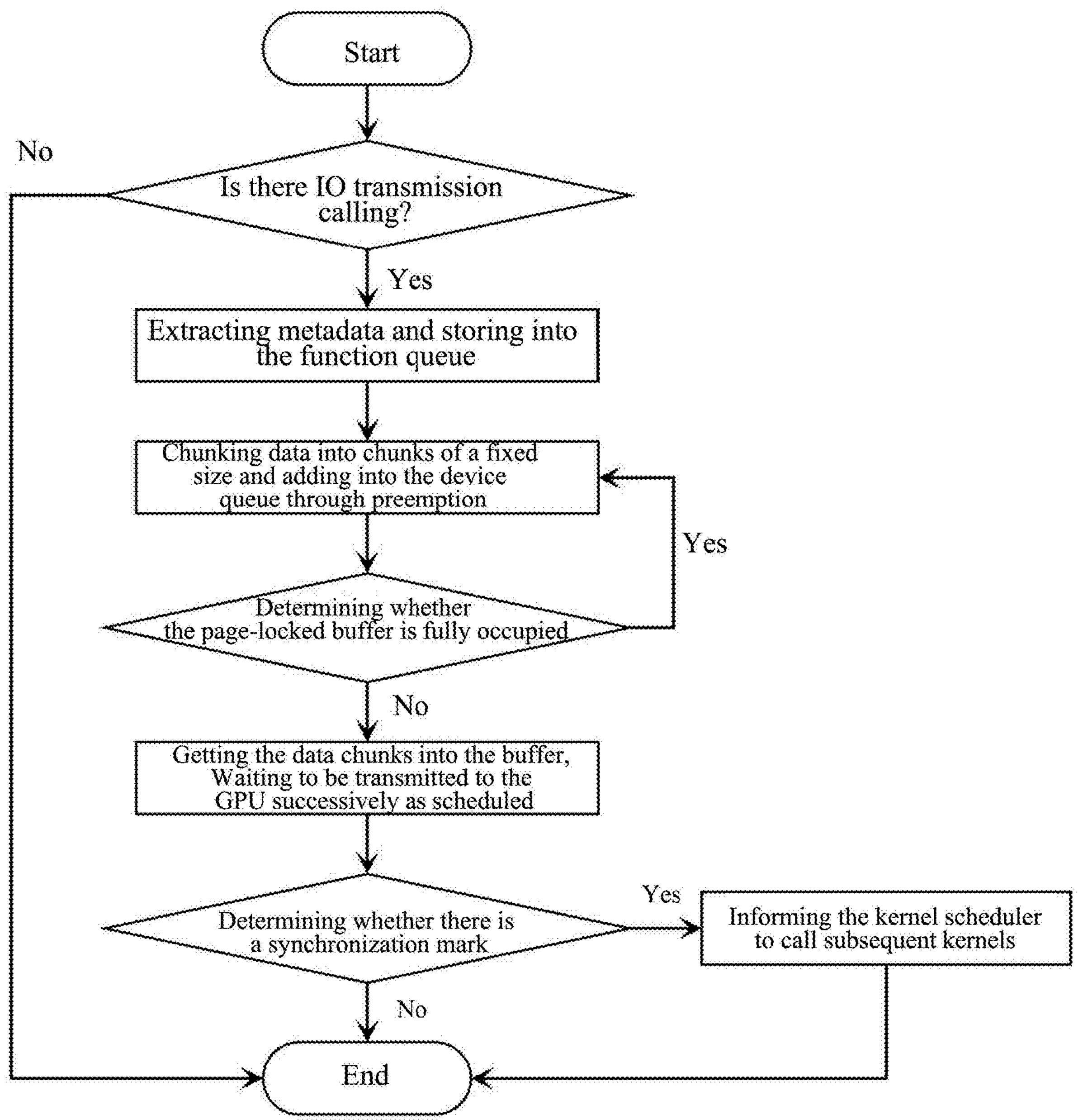
FIG. 4 is a detailed flowchart of PCIe sharing in a GPU-sharing method according to a preferred mode of the present disclosure.

FIG. 4 is a detailed flowchart of PCIe sharing in a GPU-sharing method for serverless inference loads according to a preferred mode of the present disclosure. Specifically, in order to share the PCIe bandwidth efficiently among concurrent streams, the present disclosure introduces a novel IO scheduling framework, as shown in FIG. 1. First, calls for I/O transmission (i.e., cudaMemcpyAsync) made by a function are captured and the metadata (i.e., the source addresses and the target addresses) are stored in its function queue. Further, the data are chunked into data chunks of a fixed size. Metadata of theses chunks are stored in a global device queue in a cyclic manner. A newly incoming request is added to the device queue through the preemption module. Then an IO daemon program acquires the data chunks according to the device queue, and triggers transmission of these data chunks successively. This particularly includes the following sub-steps.

The step S3.1 is about detecting whether the function contains calls for IO transmission, and if yes, jumping to the step S3.2, or otherwise, jumping to the step S3.7.

The step S3.2 is achieved by extracting metadata and storing the metadata in the local function queue.

The step S3.3 involves chunking data into chunks of a fixed size (2 MB by default, as empirically evidenced in a GPU modeled V100, being friendly to touching the peak bandwidth), and storing metadata of these chunks in a global device queue in a cyclic manner, with newly incoming requests added into the device queue through the preemption module.

In the step S3.4, it is to determine whether the page-locked transmission buffer zone is fully occupied. A GPU is unable to access data directly from the pageable memory of a CPU, and synchronously allocating pinned memory can cause considerable costs (only 200 MB can be allocated in 200 ms). Besides, excessive allocation of pinned memory can make memory scheduling at the CPU end inefficient. Therefore, the present disclosure allows functions to share a ring buffer in page-locked memory. The ring buffer is herein referred to as the transmission buffer zone. If the transmission buffer zone is fully occupied, the method proceeds with the step S3.3 to keep waiting in line. If the transmission buffer zone still has room available, the method proceeds with the step S3.5.

In the step S3.5, data chunks enter the transmission buffer zone to wait to be transmitted to the GPU successively as scheduled.

In the step S3.6, whether the data chunks have synchronization marks is determined. Since the original data have been chunked and transmitted by IO Daemon, the original synchronization in the user program becomes invalid. For DNN inference with stationary streams, data dependency (i.e., layer dependency) during computing may be obtained through offline code analysis, as indicated by the three kinds of symbols shown in FIG. 4. Thus, after the data are chunked, a synchronization mark for every chunk is recorded by data dependency. The last chunk in every layer needs to be synchronized. If this data chunk has a synchronization mark, the background thread records an event (i.e., cudaEventRecord) and calls cudaStreamWaitEvent. Then the kernel scheduler calls subsequent kernels, and the method proceeds to the step S3.7. Or otherwise, the method directly jumps to the step S3.7.

In the step S3.7, the process of the method ends.

The present disclosure uses GPU streams to enable concurrent execution of multiple functions within a GPU runtime, and based on the fact that functions are dynamically scalable, stateless, and fine-grained, further optimizes memory allocation, communication management and PCIe bandwidth sharing among streams, so as to better adapt GPU streams to functions.

Herein, an application of the disclosed method to road traffic control is described to further explain the present disclosure. As known, road traffic control usually involves three tasks: (1) object recognition: achieved by using an object detection model to recognize cars and people; (2) human face recognition: achieved by using a human face recognition algorithm to further extract individual information from human faces of the recognized objects; and (3) license plate recognition: achieved by extracting license plate information from license plates of the recognized cars. According to deployment known from the existing art, the three tasks initialize respective GPU runtimes independently, and data transmission between tasks is less efficient. In the present disclosure, GPU APIs of the three tasks are intercepted and forwarded to the same background GPU runtime so that they share the same GPU runtime and address space.

Specifically, in the three tasks, computing-related APIs are directly forwarded to a designated stream in the background GPU runtime for execution. After an API for acquiring memory is intercepted from the three tasks, the name of variable is registered into a global mapping table, and valid physical address space is required from a shared memory pool. After an API for releasing memory is intercepted from the three tasks, the physical address is returned to the memory pool, and the corresponding entry is removed from the mapping table. For data transmission among the three tasks, a global index is applied for, and the global index is registered into the index table along with the physical address for storing data. At last, the index is transmitted among the tasks as the unique mark. When any of the tasks receives the index, it can find use the index to make a search in the communication index table, so as to find the VRAM that stores the data and directly access data in the VRAM.

In this case, since the three tasks do not need to initialize a GPU runtime, respectively, they can respond fast to a traffic video stream. Additionally, since the three tasks can share data directly, requests can be processed with less delay, thereby improving the throughput for processing traffic video tasks.

People skilled in the art would appreciate that, one or more additional steps or operations may be performed before, after or between the steps described previously as a part of the disclosed method as long as the objective of the present disclosure can be achieved so as to further optimize and/or improve the disclosed method. Additionally, while the method of the present disclosure has been shown and described as a series of actions taken in a particular sequence, the present disclosure is not limited thereto. For example, some of the actions may be taken in a sequence different from that described herein. Alternatively, two or more of the actions may be taken simultaneously.

Embodiment 2

According to another aspect of the present disclosure, a GPU-sharing apparatus for serverless inference loads is provided in this embodiment, which includes one or more of the following parts:

a creation unit, for creating a memory pool;

an allocation unit, for in response to an incoming memory request, determining whether to assign a physical memory for the memory request according to type of the memory request;

an applying unit, for determining, according to an assignment attribute of the physical memory, whether to apply for at least one additional physical memory from the memory pool; and a release unit is used to determine whether to release the physical memory based on the number of accesses to the physical memory.

Preferably, the GPU-sharing apparatus can perform the GPU-sharing method as described in Embodiment 1.

According to a preferred mode, the allocation unit is further configured for: where the memory request is of the type of memory accessing, accessing a mapping table to acquire the physical memory; or otherwise, assigning a virtual address for the memory request, and inserting the assigned virtual address into the mapping table.

According to a preferred mode, the applying unit is further configured for: where the physical memory has been assigned, acquiring the physical memory from the mapping table and accessing the physical memory; or otherwise, requiring a new physical memory from the memory pool and inserting the required physical memory into the mapping table.

According to a preferred mode, the release unit is further configured to: if the access count of the physical memory has reached an access threshold, release the physical memory and updating the mapping table; or otherwise, make a query to ascertain whether there is any memory request.

Further, the GPU-sharing apparatus also includes a determination unit and a deletion unit, wherein the determination unit is used to ascertain whether there is any memory request, and the deletion unit is used to delete the entry corresponding to the physical memory just released.

According to a preferred mode, the GPU-sharing apparatus provided in this embodiment can also include:

a storing unit, for determining whether to store data into a GPU, according to whether the function contains a call for GPU communication;

a search unit, for determining a storage address for the data to store, according to the type of a data-storing-related request; and a reading unit, for determining how to read the data to be stored, according to its storage address.

According to a preferred mode, the storing unit is further configured to determine the type of the API when the function contains a call for GPU communication, or otherwise directly end the process.

According to a preferred mode, the search unit is further configured to work as below. When the request related to the stored data is to update the stored data (i.e., a PUT operation), a unique index is generated for the intermediate data to be stored into the GPU, and a GPU address is applied for storing the intermediate data. Then the global mapping table is updated. When the request related to the stored data is to make a query on the stored data (i.e., a GET operation), the search unit searches and locates the intermediate data using indexes in the global mapping table.

According to a preferred mode, the reading unit is further configured to work as below. When the intermediate data and the current function are on the same GPU, the reading unit replies with the GPU memory address, and determines whether the access count of the intermediate data has reached the threshold. Otherwise, it is to determine whether the intermediate data and the current function are on the same node. When the intermediate data and the current function are on the same node, the data are cross-GPU acquired through NVLink. Otherwise, the data are acquired remotely through RPC. The next step is to determine whether the access count of the intermediate data has reached the threshold.

According to a preferred mode, the GPU-sharing apparatus further comprises an access unit. The access unit is used to check the access count of the intermediate data. When the access count of the intermediate data has reached the access threshold (e.g., the expected maximum), the global mapping table is updated, and the GPU address and the memory space are recovered. Otherwise, the process ends directly.

Further, in the embodiment of the present disclosure, the GPU-sharing apparatus for serverless inference loads may further comprise:

- an extraction unit, for determining whether to extract metadata to the function queue according to whether the function contains calls for IO transmission;
- an insertion unit, for determining whether to add data chunks to the page-locked transmission buffer zone according to the remaining storage capacity of the page-locked transmission buffer zone; and
- a scheduling unit, for determining whether to call subsequent kernels according to the synchronization attributes of the data chunks.

Particularly, in the present disclosure, the metadata are divided into data chunks of a predetermined size (e.g., 2 MB). These chunks of the metadata are stored in a global device queue in a cyclic manner.

According to a preferred mode, the insertion unit is further configured to work as below. When there is not available storage space in the page-locked transmission buffer zone, it adds the newly incoming memory requests to the global device queue through the preemption module. Otherwise, it adds one or more data chunks into the page-locked transmission buffer zone, where the data chunks wait to be transmitted to the GPU successively as scheduled.

According to a preferred mode, the scheduling unit is further configured to work as below. When a data chunk has a synchronization mark, it makes the background thread to record an event (i.e., cudaEventRecord) and calls cudaStreamWaitEvent. The kernel scheduler continues to call the subsequent kernels. Otherwise, the process ends directly.

The GPU sharing apparatus for serverless inference loads of the present disclosure adopts the GPU sharing method for serverless inference loads described in any of the above embodiments. The beneficial effects of the GPU sharing apparatus for serverless inference loads provided by the embodiments of the present invention are the same as the beneficial effects of the GPU sharing method for serverless inference loads according to any of the above embodiments. And other technical features in the GPU sharing apparatus for serverless inference loads are the same as those disclosed in the above embodiments and will not be described again here.

The hardware devices used in the GPU-sharing method of the present disclosure include two CPUs modeled Intel Xeon® Gold 5117 and each equipped with a 128 GB DRAM; and GPUs modeled NVIDIA V100, which is an advanced datacenter-level GPU, using NVIDIA Volta, and coming with configurations of 16 GB and 32 GB, so that each GPU provides performance equal to that of up to 100 CPUs. Four V100 GPUs each equipped with a 16 GB VRAM and 80 CUs (computing units) are connected to the host through PCIe and connected to each other through NVLink. The deep learning frameworks mainly used in the present disclosure include Pytorch-1.3.0, TensorFlow-2.12, and TensorRT-6.0.1. PyTorch is an open-source Python machine learning library. It is based on Torch, and can be used for applications like natural language processing, image processing, etc. TensorFlow is an end-to-end, open-source machine learning platform. TensorRT is a neural network inference accelerator engine introduced by NVIDIA. It is based on CUDA and cudnn, and significantly accelerates inference of deep learning models on edge devices by providing 10× to 100× acceleration in the CPU or GPU mode as compared to other deep learning frameworks.

Embodiment 3

Figure 5:
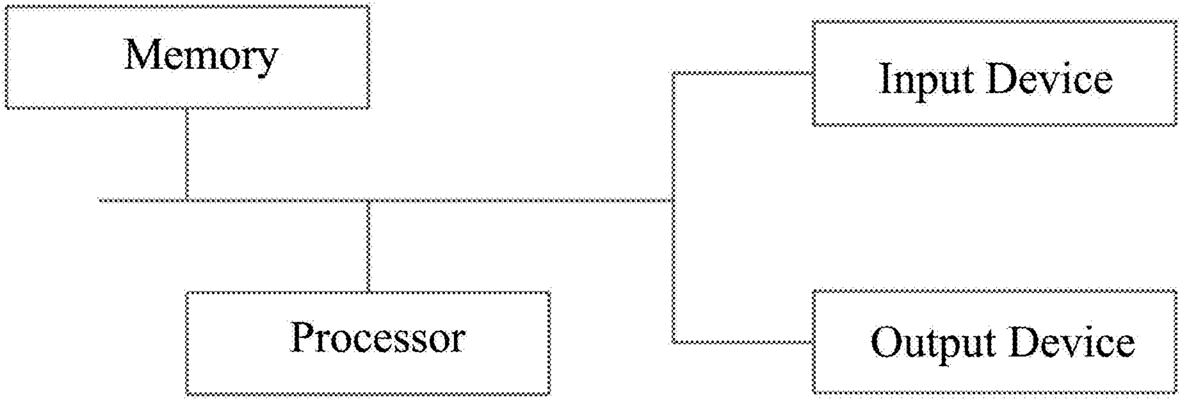
FIG. 5 is a hardware structural diagram of a computer device according to a preferred mode of the present disclosure.

According to another embodiment of the present disclosure, an electronic device for executing the GPU-sharing apparatus for serverless inference loads is provided. FIG. 5 is a hardware structural diagram of an electronic device according to a preferred mode of the present disclosure. As shown in FIG. 5, the electronic device may include one or more processors and a memory. The memory can include immortal memory, volatile memory and hard disk. Taking FIG. 5 as an example, the device may also include an input device and an output device.

According to a preferred mode, the processor, memory, input device and output device can communicate with each other through a bus or other means. The communication bus may include but is not limited to industry standard architecture bus, microchannel architecture bus, enhanced ISA bus, Video Electronics Standards Association local bus and peripheral component interconnect bus, etc.

According to a preferred mode, the processor may be a Central Processing Unit (CPU). The processor can also be other general-purpose processors, Digital Signal Processor (DSP), Application Specific Integrated Circuit (ASIC), Field-Programmable Gate Array (FPGA) or other Chips such as programmable logic devices, discrete gate or transistor logic devices, discrete hardware components, or combinations of these types of chips. A general-purpose processor may be a microprocessor or the processor may be any common processor, etc.

According to a preferred mode, as a non-transitory computer-readable storage medium, memory can include immortal memory, volatile memory and hard disk, and can be used to store non-transitory software programs, non-transitory computer executable programs and modules, just like the program instructions/modules corresponding to the GPU sharing method described in the embodiments of the present invention. The processor executes various functional applications and data processing of the server by running non-transitory software programs, instructions and modules stored in the memory, so as to implement the GPU sharing method described in any of the above embodiments.

According to a preferred mode, the memory may include a program storage area and a data storage area, wherein the program storage area may store an operating system and an application program required for at least one function; the storage data area may store data that needs to be used, etc. In addition, the memory may include high-speed random access memory and may also include non-transitory memory, such as at least one magnetic disk storage device, flash memory device, or other non-transitory solid-state storage device. In some embodiments, the memory may be a memory located remotely from the processor, and these remote memories may be connected to the data processing device through a network. Examples of the above-mentioned networks include but are not limited to the Internet, intranets, local area networks, mobile communication networks and combinations thereof.

According to a preferred mode, the input device can receive input numeric or character information and generate key signal input related to user settings and function control. The output device may include a display device such as a display screen.

According to a preferred mode, one or more modules are stored in the memory, and when executed by one or more processors, perform the method shown in the embodiment of the present disclosure.

Embodiment 4

According to another embodiment of the present disclosure, a non-transitory computer storage medium containing computer-executable instructions is also provided, wherein the computer-executable instructions when executed by a computer processor are used to perform the GPU sharing method described in any of the above embodiments.

According to a preferred mode, the computer storage medium of the present disclosure may be any combination of one or more computer-readable media. Each of the computer-readable media may be a computer-readable signal medium or a computer-readable storage medium. The computer-readable storage medium includes but is not limited to an electric, magnetic, optical, electromagnetic, infrared or semiconductor system, apparatus or device, or any combination thereof.

According to a preferred mode, more specific examples of the computer-readable storage medium include: electric connection with one or more cables, a portable computer disk, a hard drive, a random-access memory (RAM), a read-only memory (ROM), an erasable programmable read-only memory (EPROM or a flash memory), an optical fiber, a compact disc read-only memory (CD-ROM), an optical storage device, a magnetic storage device, or any combination thereof. In the present disclosure, the computer-readable storage medium may be any tangible medium containing or storing a program. The program may be used by or with a system, an apparatus or a device for executing instructions.

According to a preferred mode, the computer-readable signals medium may include data signals propagated in a baseband or as a part of carrier waves, in which computer-readable program codes are carried. Such propagated data signals may be in various forms, including but not limited to electromagnetic signals, optical signals, or any suitable combination thereof. The computer-readable signal medium may alternatively be any computer-readable medium other than a computer-readable storage medium. The computer-readable medium is able to send, propagate or transmit a program to be used by or with a system, an apparatus or a device for executing instructions.

According to a preferred mode, computer program codes used to execute the operation as described in the embodiments of the present disclosure may be written using one or more programming languages or a combination thereof. Suitable programming languages include object-oriented programming languages, such as Python, Java, Smalltalk, and C++, and include existing procedural programming languages, such as "C" language or similar programming language. The program codes may be completely executed in a user computer, partially executed in a user computer, executed as an independent software pack, partially executed in a user computer while partially executed in a remote computer, or completely executed in a remote computer or a server. In a case where a remote computer is involved, the remote computer may be connected to the user computer through a network of any type, such as a local area network (LAN) or a wide area network (WAN). Alternatively, it may be connected to an external computer (such as connected through the Internet by an Internet service provider).

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like "preferably" or "according to a preferred mode". Each of the inventive concepts represents an independent conception and the applicant reserves the right to file one or more divisional applications therefor.

What is claimed is:

1. A GPU-sharing method for serverless inference loads, comprising:

with a CPU and a plurality of GPUs connected through a bus, making the GPUs communicate with the CPU only through an API proxy at the CPU, so that the API proxy manages processes of the GPUs and allocates resources of the GPUs, wherein the CPU intercepts all GPU APIs triggered by any function of a same inference application; and wherein the CPU forwards the intercepted GPU APIs to a same designated GPU runtime for execution, and directs the GPU APIs triggered by each function to a stream pool designated for the very same inference application in advance, so that all of the functions of the same inference application when executed share the same GPU runtime.

2. The GPU-sharing method of claim 1, wherein the API proxy manages the processes of the GPUs and allocates the resources of the GPUs through:

creating a memory pool;

in response to an incoming memory request, determining whether to assign a physical memory for the memory request according to type of the memory request;

determining, according to an assignment attribute of the physical memory, whether to apply for at least one additional physical memory from the memory pool; and determining whether to release the physical memory according to an access count of the physical memory.

3. The GPU-sharing method of claim 2, wherein the step of "determining whether to assign a physical memory for the memory request according to type of the memory request" comprises:

where the memory request is of the type of memory accessing, accessing a mapping table to acquire the physical memory; and otherwise, assigning a virtual address for the memory request, and inserting the assigned virtual address into the mapping table.

4. The GPU-sharing method of claim 3, wherein the step of "determining, according to an assignment attribute of the physical memory, whether to apply for at least one additional physical memory from the memory pool" comprises:

where the physical memory has been assigned, acquiring the physical memory from the mapping table and accessing the physical memory; and otherwise, requiring a new physical memory from the memory pool and inserting the required physical memory into the mapping table.

5. The GPU-sharing method of claim 4, wherein the step of "determining whether to release the physical memory according to an access count of the physical memory" comprises:

where the access count of the physical memory has reached a predetermined threshold, releasing the physical memory and updating the mapping table; and otherwise, making a query to ascertain whether there is any memory request.

6. The GPU-sharing method of claim 5, further comprising:

according to whether the function contains a call for GPU communication, determining whether to store data into a said GPU;

according to the type of a data-storing-related request, determining a storage address for the data to store; and according to the storage address, determining how to read the data to be stored.

7. The GPU-sharing method of claim 6, wherein the step of "according to the type of a data-storing-related request, determining a storage address for the data to store" comprises:

where the data-storing-related request is of the type of updating to store data, generating a unique index for intermediate data to be stored into the GPU, requiring a GPU address for storage of the intermediate data, and updating a global mapping table; and where the data-storing-related request is of the type of querying to store data, finding an address of the intermediate data using indexes on the global mapping table.

8. The GPU-sharing method of claim 7, wherein the step of "according to the storage address, determining how to read the data to be stored" comprises:

where the address of the intermediate data and the current function are present in the same GPU, replying with a GPU memory address, and determining whether an access count of the intermediate data has reached a predetermined threshold; and otherwise, determining whether the address of the intermediate data and the current function are present in a same node; and where the address of the intermediate data and the current function are present in the same node, acquiring the data in a cross-GPU manner through NVLink; and otherwise, remotely acquiring the data through RPC, and determining whether the access count of the intermediate data has reached the threshold;

wherein where the access count of the intermediate data has reached the threshold, updating the global mapping table, recovering the GPU address and a corresponding memory space, and ending the process; and otherwise, ending the process directly.

9. The GPU-sharing method of claim 8, further comprising:

according to whether the function contains a call for IO transmission, determining whether to extract metadata and add the metadata to a function queue, wherein the metadata are divided into data chunks of a predetermined size and stored in a global device queue in a cyclic manner;

and according to remaining storage capacity of a page-locked transmission buffer zone, determining whether to add the data chunks into the page-locked transmission buffer zone, and according to a synchronization attribute of the data chunks, determining whether to call a subsequent kernel.

10. The GPU-sharing method of claim 9, wherein the step of "according to remaining storage capacity of a page-locked transmission buffer zone, determining whether to add the data chunks into the page-locked transmission buffer zone, and according to a synchronization attribute of the data chunks, determining whether to call a subsequent kernel" comprises:

where the page-locked transmission buffer zone does not have any remaining storage capacity, adding a newly incoming memory request to the global device queue through a preemption module; and otherwise, adding the data chunks to the page-locked transmission buffer zone so that the data chunks wait to be transmitted to the GPU successively as scheduled;

wherein where any of the data chunks has a synchronization mark, a background thread records an event, and calls cudaStreamWaitEvent, and a kernel scheduler schedules a subsequent kernel, after which this process ends; and otherwise, this process ends directly.

11. A GPU-sharing system for serverless inference loads, comprising:

a CPU and a plurality of GPUs connected through a bus, the GPUs communicate with the CPU only through an API proxy at the CPU, so that the API proxy manages processes of the GPUs and allocates resources of the GPUs, wherein the CPU intercepts all GPU APIs triggered by any function of a same inference application; and wherein the CPU forwards the intercepted GPU APIs to a same designated GPU runtime for execution, and directs the GPU APIs triggered by each function to a stream pool designated for the very same inference application in advance, so that all of the functions of the same inference application when executed share the same GPU runtime.

12. The GPU-sharing system of claim 11, wherein the API proxy manages the processes of the GPUs and allocates the resources of the GPUs through:

creating a memory pool;

in response to an incoming memory request, determining whether to assign a physical memory for the memory request according to type of the memory request;

determining, according to an assignment attribute of the physical memory, whether to apply for at least one additional physical memory from the memory pool; and determining whether to release the physical memory according to an access count of the physical memory.

13. The GPU-sharing system of claim 12, wherein the step of "determining whether to assign a physical memory for the memory request according to type of the memory request" comprises:

where the memory request is of the type of memory accessing, accessing a mapping table to acquire the physical memory; and otherwise, assigning a virtual address for the memory request, and inserting the assigned virtual address into the mapping table.

14. The GPU-sharing system of claim 13, wherein the step of "determining, according to an assignment attribute of the physical memory, whether to apply for at least one additional physical memory from the memory pool" comprises:

where the physical memory has been assigned, acquiring the physical memory from the mapping table and accessing the physical memory; and otherwise, requiring a new physical memory from the memory pool and inserting the required physical memory into the mapping table.

15. The GPU-sharing system of claim 14, wherein the step of "determining whether to release the physical memory according to an access count of the physical memory" comprises:

where the access count of the physical memory has reached a predetermined threshold, releasing the physical memory and updating the mapping table; and otherwise, making a query to ascertain whether there is any memory request.

16. The GPU-sharing system of claim 15, further configured for:

according to whether the function contains a call for GPU communication, determining whether to store data into a said GPU;

according to the type of a data-storing-related request, determining a storage address for the data to store; and according to the storage address, determining how to read the data to be stored.

17. The GPU-sharing system of claim 16, wherein the step of "according to the type of a data-storing-related request, determining a storage address for the data to store" comprises:

where the data-storing-related request is of the type of updating to store data, generating a unique index for intermediate data to be stored into the GPU, requiring a GPU address for storage of the intermediate data, and updating a global mapping table; and where the data-storing-related request is of the type of querying to store data, finding an address of the intermediate data using indexes on the global mapping table.

18. The GPU-sharing system of claim 17, wherein the step of "according to the storage address, determining how to read the data to be stored" comprises:

where the address of the intermediate data and the current function are present in the same GPU, replying with a GPU memory address, and determining whether an access count of the intermediate data has reached a predetermined threshold; and otherwise, determining whether the address of the intermediate data and the current function are present in a same node; and where the address of the intermediate data and the current function are present in the same node, acquiring the data in a cross-GPU manner through NVLink; and otherwise, remotely acquiring the data through RPC, and determining whether the access count of the intermediate data has reached the threshold;

wherein where the access count of the intermediate data has reached the threshold, updating the global mapping table, recovering the GPU address and a corresponding memory space, and ending the process; and otherwise, ending the process directly.

19. The GPU-sharing system of claim 18, further configured for:

according to whether the function contains a call for IO transmission, determining whether to extract metadata and add the metadata to a function queue, wherein the metadata are divided into data chunks of a predetermined size and stored in a global device queue in a cyclic manner; and according to remaining storage capacity of a page-locked transmission buffer zone, determining whether to add the data chunks into the page-locked transmission buffer zone, and according to a synchronization attribute of the data chunks, determining whether to call a subsequent kernel.

20. The GPU-sharing system of claim 19, wherein the step of "according to remaining storage capacity of a page-locked transmission buffer zone, determining whether to add the data chunks into the page-locked transmission buffer zone, and according to a synchronization attribute of the data chunks, determining whether to call a subsequent kernel" comprises:

where the page-locked transmission buffer zone does not have any remaining storage capacity, adding a newly incoming memory request to the global device queue through a preemption module; and otherwise, adding the data chunks to the page-locked transmission buffer zone so that the data chunks wait to be transmitted to the GPU successively as scheduled;

wherein where any of the data chunks has a synchronization mark, a background thread records an event, and calls cudaStreamWaitEvent, and a kernel scheduler schedules a subsequent kernel, after which this process ends; and otherwise, this process ends directly.

* * * * *